３,188,352
PHENOLIC THIOETHERS
Walter Reifschneider, Midland, Mich., assignor to The Dow Chemical Company, Midland, Mich., a corporation of Delaware
No Drawing. Filed June 27, 1962, Ser. No. 205,502
2 Claims. (Cl. 260—609)

The present invention is directed to thioethers and in particular is directed to novel thioethers corresponding to the formula

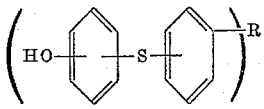

In the present specification and claims, R represents a member of the group consisting of alkyl of from 3 to 6, inclusive, carbon atoms and cycloalkyl. Thus, the present compounds are of either one of the types

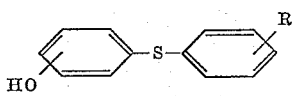

and

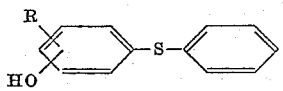

The novel compounds are colorless oils or crystalline solids appearing white in mass, very slightly soluble in water but readily soluble in various common organic solvents such as lower alkanols, benzene and the like. Typically, it appears that the compounds having R on a hydroxyl-bearing benzene nucleus tend to be crystalline, and those having R on a nucleus having a hydroxyphenylthio substituent tend to be oils, at room temperature. The compounds are useful as insecticides and herbicides. As inhibitors of the germination of fungus spores, they are effective fungistats. The compounds are also useful as additives to lubricating oils; they are useful as intermediates in the preparation of dyestuffs and biologically active materials; they are also of value as solvent additives in the modification of behavior of mixed solvent systems. Certain of them are advantageous in improving the friable condition of agricultural oils susceptible of formation of dense, compacted structures.

The compounds are prepared in various ways. A first preferred way is by a process which comprises the steps of causing a reaction between an aromatic halide compound corresponding to the formula

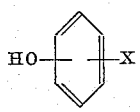

wherein X represents halogen, and a mercptan corresponding to the formula

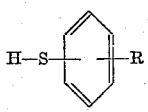

In a second preferred way, the aromatic halide compound

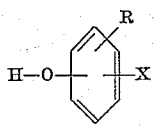

is caused to react with a mercaptan compound

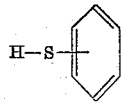

Instead of mercaptan, an alkali metal mercaptide or cuprous mercaptide may be employed. During the reaction to prepare the present compounds, one molecule of mercaptan (that is, aromatic thio) reacts with each molecule of aromatic halide. Small amounts of mercaptan may be lost in side reactions. Thus, when it is desired to prepare a present compound in a high state of purity and with a minimum of necessary post-synthesis purification procedure, the starting reactants should be employed in equimolecular proportions, or preferably, with the mercaptan in slight excess. However, other proportions may be employed if desired, and unconsumed starting material of whatever identity may, if desired, be recycled into further synthesis process.

In either method, the reaction goes forward at temperatures over a wide range such as from 30° to 350° C., but initiates most readily when heated to a temperature somewhat higher than room temperature. A preferred temperature range is from 130° to 230° C. Under these conditions the reaction is, in general, exothermic and goes forward to completion with good yield calculated upon the basis of consumed starting material. Hydrogen halide of reaction is evolved and means for its orderly disposal are advantageously provided.

Typically, in the preparation of the compounds of the present invention, reaction between the mercaptan starting material and the aromatic halide starting material will initiate and go forward only when there is employed a catalytic amount of both a source of cuprous ion and a nitrogenous base. Thus, in the preparation of many, and probably all of the present compounds, the employment of such catalyst is essential and critical, although the exact weight is not critical. Certainly the employment of such catalyst is in all cases highly advantageous. The source of cuprous ion can be metallic copper, in which case the copper reacts in some way to obtain cuprous halide. Also, cuprous oxide can be employed as a source of cuprous ion in which case water of reaction is evolved and cuprous halide results. Cuprous chloride itself or other cuprous salt may be employed. The employed weight is not critical, but may vary from a very small trace amount, less than $\frac{1}{100}$ of 1 molar percent, to as much as an amount equimolecular with either reactant or even greater. In general, the employment of larger amounts is accompanied by no major advantage and, being expensive, is not preferred.

The nitrogenous base can be ammonia, a primary, secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise, such base is dissolved in inert liquid reaction medium such as a hydrocarbon oil.

It is preferred, in at least laboratory preparations, to employ the nitrogenous base catalyst substance in sufficient excess that portions of it may also act as hydrogen halide acceptor and yet further portions may continue to function, unreacted, in the necessary catalytic manner.

In carrying out the reaction to prepare the compounds of the present invention, the aromatic halide and the mercaptan are intimately mixed and blended, in any order and in desired amounts, with source of cuprous ion and nitrogenous base as hereinbefore described, and thereafter heated to a temperature at which reaction takes place promptly. In one convenient method of practicing the present method, the reaction temperature may be the reflux temperature of the liquid reaction mixture. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate forms from which the desired product can be extracted as a solvent-soluble fraction. Representative extraction solvents include diethyl ether, chlorinated hydrocarbons, and benzene. In any event, the reaction product is extracted with solvent, the solvent extract dried over an inert drying agent such as, for example, anhydrous potassium sulfate or the like; the solvent vaporized and removed and the remaining product chilled or otherwise treated to induce crystallization and, if desired, recrystallized from a solvent such as a lower alkanol: or it can be vacuum distilled.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

*Example I.—o-(p-Isopropylphenylthio)phenol*

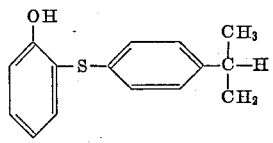

A reaction mixture is prepared, consisting of 12.8 grams (0.1 mole) of o-chlorophenol, 5 grams of cuprous bromide, and 15.3 grams (0.1 mole) of p-isopropylbenzenethiol dispersed in a mixture consisting of 110 milliliters quinoline and 10 milliliters pyridine. The resulting reaction mixture is placed in a flask under reflux. In this situation, the reaction mixture is heated at its reflux temperature (a pot temperature between approximately 200° and 240° C.) for 6 hours to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resutling acidified water a precipitate forms. The precipitate is collected by filtration and extracted with ether, the ether extract liquid being saved. This liquid is dried over a bed of anhydrous potassium sulfate; the resulting liquid is warmed to vaporize and remove ether solvent and obtain a residual oil. This oil is distilled under declining subatmospheric pressure to obtain a colorless oily o-(p-isopropylphenylthio)phenol product having a molecular weight of 244.36.

*Example II.—o-(p-Tertiarybutylphenylthio)phenol*

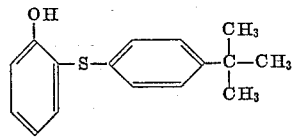

In procedures essentially similar to the foregoing except that the starting benzenethiol is p-tert-butylbenzenethiol, there is prepared, in good yield, o-(p-tertiarybutylphenylthio)phenol as a colorless oil of molecular weight of 258.4, boiling at 175°–177° C. under 3 millimeters mercury pressure, absolute. The compound, when employed as sole toxic agent for the control of bean aphids and tomato early blight, gives good control. It is active also against many other kinds of insects. Also, it is toxic to trash fish when added in low concentration to the water which constitutes their habitat.

*Example III.—m-(o-Cyclohexylphenylthio)phenol*

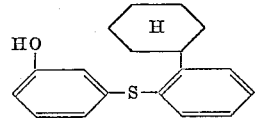

A reaction mixture is prepared consisting of 17.3 grams (0.1 mole of m-bromophenol, 7.2 grams technical cuprous oxide, 25.2 grams (0.1 mole) o-cyclohexylbenzenethiol dispersed together in 130 milliliters technical 2,4-lutidine and 60 milliliters quinoline, as mixed liquid reaction medium. The resulting reaction mixture is heated, with stirring, at its boiling temperature and under reflux for approximately 3 hours, the reflux condenser being equipped with a water separator. At the conclusion of the reaction time, the resulting hot mixture is poured directly into a mixture of chipped ice and 200 milliliters concentrated hydrochloric acid. As a result of these procedures, the ice melts and a brown solid separates in the resulting aqueous dispersion. This solid is collected by filtration and a chloroform extract made of it. The chloroform extract is washed twice with 10 percent hydrochloric acid and then dried over anhydrous potassium sulfate. From the resulting dry chloroform solution, chloroform solvent is evaporated, leaving a pale tan oil which is distilled under subatmospheric pressure to obtain m-(o-cyclohexylphenylthio)phenol as a clear, colorless oil having a molecular weight of 344.5. The product is soluble in lower alkanols, and is useful as toxicant to control various insects and plant disease fungi.

*Example IV.—4-tertiarybutyl-2-(phenylthio)phenol*

A reaction mixture is prepared consisting essentially of 18.5 grams (0.1 mole) of 2-chloro-4-tertiarybutylphenol, 11.0 grams (0.10 mole) of benzenethiol and 1 gram cuprous bromide dispersed together in 200 milliliters mixed technical xylidines as hydrogen halide acceptor, catalyst, and liquid reaction medium. The resulting reaction mixture is heated for approximately 18 hours, at its boiling temperature and under reflux and with stirring, to carry the reaction to completion. At the conclusion of the reaction time, the resulting hot mixture is poured directly into a mixture of chipped ice together with 250 milliliters concentrated hydrochloric acid. As a result of these procedures, the ice melts and a dark solid separates in the resulting aqeuous dispersion. This solid is collected by filtration and a benzene extract thereof prepared, washed twice with 10 percent hydrochloric acid and dried over anhydrous potassium sulfate. From the resulting dry benzene solution, benzene solvent is heated and vaporized to obtain a light-colored solid which is recrystallized from isopropanol to obtain white crystals of 4-tertiarybutyl-2-(phenylthio)-phenol which is a solid at room temperature and has a molecular weight of 258.4 The crystals melt at 73.5–75.5° C.

In procedures essentially the same as the foregoing, by the use of appropriate starting materials, other products of the present invention are prepared as follows:

From 4-fluoro-2-n-hexylphenol and benzenethiol in the presence of 5 mole percent of cuprous oxide in a propanol solution of secondary n-butylamine, a 2-n-hexyl-4-(phenylthio)phenol.

From 2-bromo-3-(2-methyl)butylphenol and benzenethiol in the presence of 1 mole percent cuprous phosphate and in a liquid lutidine-quinoline mixture, a 2-phenylthio-3-(2-methyl)butylphenol.

From o-chlorophenol and o-n-propylbenzenethiol, an o-(o-propylphenylthio)phenol, using a pyridine-collidine reaction mixture and cuprous acetate as catalyst.

The halophenols and alkyl halophenols, benzenethiols and alkylhydroxybenzenethiols used as starting materials in the present invention are, for the most part, articles of commerce. Those that are not are readily prepared in known syntheses. Synthetic procedures appropriate for the thiol compounds are set forth in "Organic Chemistry of Bivalent Sulfur" (Chemical Publishing Co., New York, 1958) by Reid, volume 1, Chapter 1, pages 18 and following, especially 37 and following, and the references there cited.

Synthetic procedures appropriate for the halophenol compounds are well known: the Sandmeyer and Schiemann reaction permit preparation of particular position isomer compounds in good purity.

I claim:
1. o-(p-Isopropylphenylthio)phenol.
2. m-(o-Cyclohexylphenylthio)phenol.

References Cited by the Examiner

Chemical Abstracts 44 (Index), p. 12725 (1950), column 2.

CHARLES B. PARKER, *Primary Examiner*.

D. D. HORWITZ, *Examiner*.